United States Patent
Detjens et al.

(10) Patent No.: US 7,207,097 B2
(45) Date of Patent: Apr. 24, 2007

(54) METHOD FOR MAKING AN ACTUATOR ASSEMBLY FOR SUPPORTING A READ/WRITE DEVICE IN AN INFORMATION STORAGE DEVICE

(75) Inventors: Michael E. Detjens, Altoona, WI (US); Craig A. Leabch, Saint Cloud, MN (US); Shane J. Van Sloun, Waconia, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 251 days.

(21) Appl. No.: 10/767,944

(22) Filed: Jan. 29, 2004

(65) Prior Publication Data

US 2004/0181933 A1 Sep. 23, 2004

Related U.S. Application Data

(62) Division of application No. 09/950,267, filed on Sep. 10, 2001, now Pat. No. 6,704,163.

(60) Provisional application No. 60/231,893, filed on Sep. 11, 2000.

(51) Int. Cl.
*G11B 5/127* (2006.01)
*H04R 31/00* (2006.01)

(52) U.S. Cl. .............. 29/603.06; 29/603.03; 29/603.1; 29/603.12; 29/603.16; 29/831; 360/234.5; 360/235.8; 360/244.5; 216/22; 438/3

(58) Field of Classification Search ............ 29/603.07, 29/603.1, 603.12, 603.16, 851; 360/234.5, 360/235.8, 244.5; 216/22; 438/3
See application file for complete search history.

(56) References Cited

U.S. PATENT DOCUMENTS

| | | | | |
|---|---|---|---|---|
| 4,822,671 A | * | 4/1989 | Carper et al. | 428/33 |
| 4,991,045 A | * | 2/1991 | Oberg | 360/244.3 |
| 5,313,355 A | * | 5/1994 | Hagen | 360/244.5 |
| 5,355,267 A | | 10/1994 | Aoyagi | |
| 5,491,597 A | | 2/1996 | Bennin et al. | |
| 5,691,581 A | | 11/1997 | Umehara et al. | |
| 5,715,117 A | | 2/1998 | Brooks | |
| 5,862,019 A | | 1/1999 | Larson | |
| 6,634,084 B1 | * | 10/2003 | Schmidt et al. | 29/603.03 |
| 6,704,163 B1 | | 3/2004 | Detjens et al. | |

OTHER PUBLICATIONS

"A design of high performance inline head assembly for high-speed access"; Ohwe, T.; Yoneoka, S.; Aruga, K.; Yamada, T.; Mizoshita, Y.; Magnetics, IEEE Transactions on vol. 26, Issue 5; Sep. 1990; pp. 2445-2447.*

* cited by examiner

*Primary Examiner*—Paul D. Kim
(74) *Attorney, Agent, or Firm*—Faegre & Benson LLP

(57) ABSTRACT

An actuator assembly for supporting a read/write device in an information storage device having an actuator arm having at least one tower protruding from a first surface of the actuator arm, a loadbeam having at least one tower receiving means for receiving the at least one tower, wherein the at least one tower is shaped to extend into the at least one tower receiving means when the loadbeam is joined with the actuator arm, and wherein the tower and tower receiving means are configured such that deforming the at least one tower when within the at least one tower receiving means provides a deformation interference between the at least one tower and the at least one tower receiving means that reduces movement of the tower receiving means relative to the tower.

16 Claims, 4 Drawing Sheets

METHOD FOR MAKING AN ACTUATOR ASSEMBLY FOR SUPPORTING A READ/WRITE DEVICE IN AN INFORMATION STORAGE DEVICE

REFERENCE TO RELATED APPLICATIONS

This application claims the benefit of U.S. application Ser. No. 09/950,267, filed Sep. 10, 2001, now U.S. Pat. No. 6,704,163, and entitled DEFORMABLE TOWERS USEFUL FOR ASSEMBLY OF SUSPENSIONS USED IN A DATA STORAGE DRIVE, which claims the benefit of U.S. Provisional Application No. 60/231,893, filed Sep. 11, 2000, which are hereby incorporated by reference in their entirety.

TECHNICAL FIELD

The present invention relates to suspensions or suspension assemblies, at least a portion of which may be assembled using techniques not primarily reliant on welding, brazing, or the use of an adhesive.

BACKGROUND

In a dynamic storage device, a rotating disk is employed to store information in small magnetized domains strategically located on the disk surface. The disk is attached to and rotated by a spindle motor mounted to a frame of the disk storage device. A "head slider" (also commonly referred to simply as a "slider") having a magnetic read/write head is positioned in close proximity to the rotating disk to enable the writing and reading of data to and from the magnetic domains on the disk. The head slider is supported and properly oriented in relationship to the disk by a head suspension that provides forces and compliances necessary for proper slider operation. As the disk in the storage device rotates beneath the slider and head suspension, the air above the disk similarly rotates, thus creating an air bearing which acts with an aerodynamic design of the head slider to create a lift force on the head slider. The lift force is counteracted by the head suspension, thus positioning the slider at a height and alignment above the disk which is referred to as the "fly height."

Some head suspensions can include a loadbeam, a flexure, and a base plate. The loadbeam normally includes a mounting region at a proximal end of the loadbeam for mounting the head suspension to an actuator of the disk drive, a rigid region, and a spring region between the mounting region and the rigid region for providing a spring force to counteract the aerodynamic lift force acting on the slider described above. The base plate is mounted to the mounting region of the loadbeam to facilitate the attachment of the head suspension to the actuator. The flexure is positioned at the distal end of the loadbeam, and typically includes a gimbal region having a slider mounting surface to which the slider is mounted and thereby supported in read/write orientation with respect to the rotating disk. The gimbal region is resiliently moveable with respect to the remainder of the flexure in response to the aerodynamic forces generated by the air bearing.

In one type of head suspension, the flexure is formed as a separate component and further includes a loadbeam mounting region that is rigidly mounted at the distal end of the loadbeam using conventional means, such as spot welds. In such a flexure, the gimbal region extends distally from the loadbeam mounting region of the flexure and includes a cantilever beam to which the slider is mounted. A generally spherical dimple that extends between the loadbeam and the slider mounting surface of the flexure is formed in either the loadbeam or the slider mounting surface of the flexure. The dimple transfers the spring force generated by the spring region of the loadbeam to the flexure and the slider to counteract the aerodynamic force generated by the air bearing between the slider and the rotating disk. In this manner, the dimple acts as a "load point" between the flexure/slider and the loadbeam. The load point dimple also provides clearance between the cantilever beam of the flexure and the loadbeam, and serves as a point about which the slider can gimbal in pitch and roll directions in response to fluctuations in the aerodynamic forces generated by the air bearing.

Electrical interconnection between the head slider and circuitry in the disk storage device is provided along the length of the head suspension. Conventionally, conductive wires encapsulated in insulating tubes are strung along the length of the head suspension between the head slider and the storage device circuitry. Alternatively, an integrated lead head suspension, such as that described in commonly assigned U.S. Pat. No. 5,491,597 to Bennin et al., that includes one or more conductive traces bonded to the loadbeam with a dielectric adhesive can be used to provide electrical interconnection. Such an integrated lead head suspension may include one or more bonding pads at the distal end of the traces to which the head slider is attached and that provide electrical interconnection to terminals on the head slider. The conductive trace can also be configured to provide sufficient resiliency to allow the head slider to gimbal in response to the variations in the aerodynamic forces.

As the number and density of magnetic domains on the rotating disk increase, it becomes increasingly important that the head slider be precisely aligned over the disk to ensure the proper writing and reading of data to and from the magnetic domains. Moreover, misalignments between the head slider and the disk could result in the head slider "crashing" into the disk surface as the slider gimbals due to the close proximity of the head slider to the rotating disk at the slider fly height.

The joining of the loadbeam to the actuator arm and the flexure to the loadbeam have been accomplished in various ways, including spot welding. One problem associated with spot welding is the desire to spot weld two members composed of the same material. For example, two members made of steel will generally be better joined together with spot welding than if one of the members were composed of aluminum and the other of steel. The same is seen when spot welding polymeric materials. This can create an undesirable limitation, that being, the need or motivation to use members of the same composition rather than dissimilar composition. This is undesirable because the use of dissimilar compositions can allow for different material properties, desired interfacial relationship between dissimilar materials, and/or cost reductions.

Another joining technique can include the use of a joining material or a joining member to join two members. Such techniques include the use of an adhesive, a soldering material, or a mechanical fastening piece or clip. Introduction of a joining material or member, however, can add undesired complexity to one or more aspects of inventory, assembly, use, and repair relating to the suspension member.

Consequently, there is a need for a suspension design and/or assembly technique that addresses the above-mentioned undesirable results. Such a design and/or assembly technique could be useful with the above-described suspension as well as unamount-type suspensions, which include discrete arms.

SUMMARY OF THE INVENTION

The present invention addresses problems not addressed by the prior art. One embodiment of the invention includes a method for making an actuator assembly for supporting a read/write device in an information storage device. It includes providing a actuator arm having at least one tower on a first arm surface of the actuator arm. Another step involves providing a loadbeam comprising tower receiving means for receiving the at least one tower. Another step is placing the loadbeam onto the actuator arm such that the at least one tower is received by the tower receiving means. Still another step is deforming the tower to provide a deformation interference between the at least one tower and the tower receiving means and reduce lifting of the loadbeam from the actuator arm where the interference occurs.

The actuator arm and the tower may be comprised of a first metal and the loadbeam is comprised of a second metal. The first metal could be different from the second metal. The first metal could be aluminum and the second metal could be steel, such as stainless steel.

The loadbeam can have a first loadbeam surface. The previously noted difference between the first and second metals prevents or complicates attaching the loadbeam to the actuator arm by spot welding, ultrasonically welding, or other welding of the first loadbeam surface to the first arm surface.

The previously-noted tower receiving means can be a first loadbeam surface having a hole through which the at least one tower protrudes after the placing step.

The previously noted at least one tower could include, rather, a plurality of towers. The tower receiving means can include a first loadbeam surface having a plurality of holes through which the plurality of towers protrude after the placing step. The hole and the tower may each have a generally circular shape or an elongated shape or some other shape.

The previously-noted actuator arm can further include an arm registering means. The loadbeam can further include a loadbeam registering means. Such an arm registering means could have a first arm registering hole therethrough, and such loadbeam registering means could have a first loadbeam registering hole therethrough. The method could further comprise the step of placing the arm and loadbeam onto an assembly fixture having a first registering member such that the first registering member protrudes through the first arm registering hole and through the first loadbeam registering hole.

The arm registering means can further have a second arm registering hole therethrough. The loadbeam registering means can have a second loadbeam registering hole therethrough. The assembly fixture can further have a second registering member. The step of placing the arm and loadbeam onto an assembly fixture can cause the second registering member to protrude through the second arm registering hole and the second loadbeam registering hole.

The previously-noted deforming step comprises the mechanically deforming the tower to provide the deformation interference. The at least one tower can be comprised of a metal and the deforming step can comprise melting the metal to provide the deformation interference. The melting can be accomplished by an application of one of a laser beam, ultrasonic energy, contact with a heated member, and another heating means.

Initial interference can exist between the at least one tower and the tower receiving means before the deforming step.

Still another embodiment of the present invention includes an actuator assembly for supporting a read/write device in an information storage device. It can include an actuator arm having at least one tower protruding from a first surface of the actuator arm. A loadbeam can have at least one tower receiving means for receiving the at least one tower. The at least one tower is shaped to extend into the at least one tower receiving means when the loadbeam is joined with the actuator arm, and wherein the tower and tower receiving means are configured such that deforming the at least one tower when within the at least one tower receiving means provides a deformation interference between the at least one tower and the at least one tower receiving means. This can reduce movement of the tower receiving means relative to the tower.

The actuator arm can have a proximal region and a distal region. The at least one tower can protrude from the first surface within the distal region. The actuator arm can be comprised of a first metal, and the loadbeam can be comprised of a second metal, i.e., different from the first. For example, the first metal can be aluminum and the second metal can be steel, e.g., stainless steel. The at least one tower can have a shape and a composition such that it may be mechanically deformed to provide the deformation interference and allow for performance of the actuator assembly within the information storage device. The tower can have a tower shape and a metal-based composition such that it may be thermally deformed to provide the deformation interference and allow for the performance.

The tower receiving means can include a first loadbeam surface having at least one hole through which the at least one tower protrudes when the loadbeam is placed on the actuator arm. The at least one hole can be a plurality of holes, and the at least one tower can include a plurality of towers. The tower(s) and hole(s) can be circular shaped, elongate shaped, rectangular shaped, triangular shaped, or have a more complex shape.

Still another embodiment of the present invention can be an actuator assembly for supporting a read/write device in an information storage device. It can include an actuator arm having at least one tower protruding from a first surface of the actuator arm. The at least one tower can be configured to be deform when at least one of sufficient heat or sufficient pressure is applied thereto. A loadbeam can have a first loadbeam surface with at least one tower hole into which the at least one tower can be inserted. The at least one tower can be shaped to extend into the at least one tower hole when the loadbeam is joined with the actuator arm. The tower and tower hole are configured such that an application of at least one of sufficient heat or sufficient pressure to the at least one tower results in deformation of the at least one tower that secures the loadbeam to the actuator arm. The at least one tower can include one, two, three, four, or even more towers. And, the at least one tower hole can include a like number.

The tower(s) can, instead, be positioned on the loadbeam with the holes or other receiving means positioned on the actuator arms. Similarly, one or more towers and tower holes can be on one of these components that match up correspondingly with tower holes and towers on the other component.

DETAILED DESCRIPTION OF PREFERRED EMBODIMENTS

Figure 1:
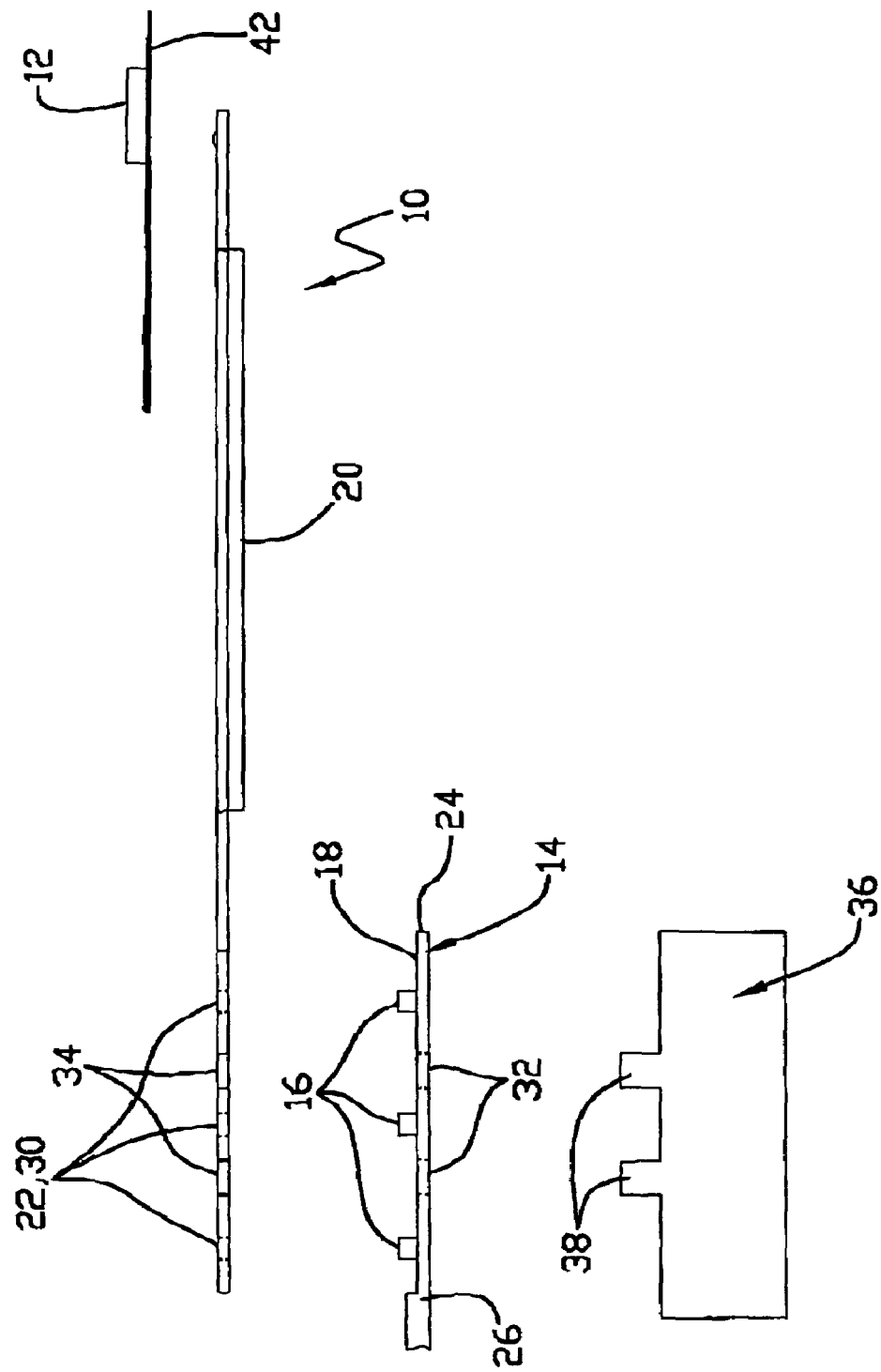
FIG. 1 is a cross-section, side view of an embodiment of the present invention, wherein components are not assembled.
Figure 2:
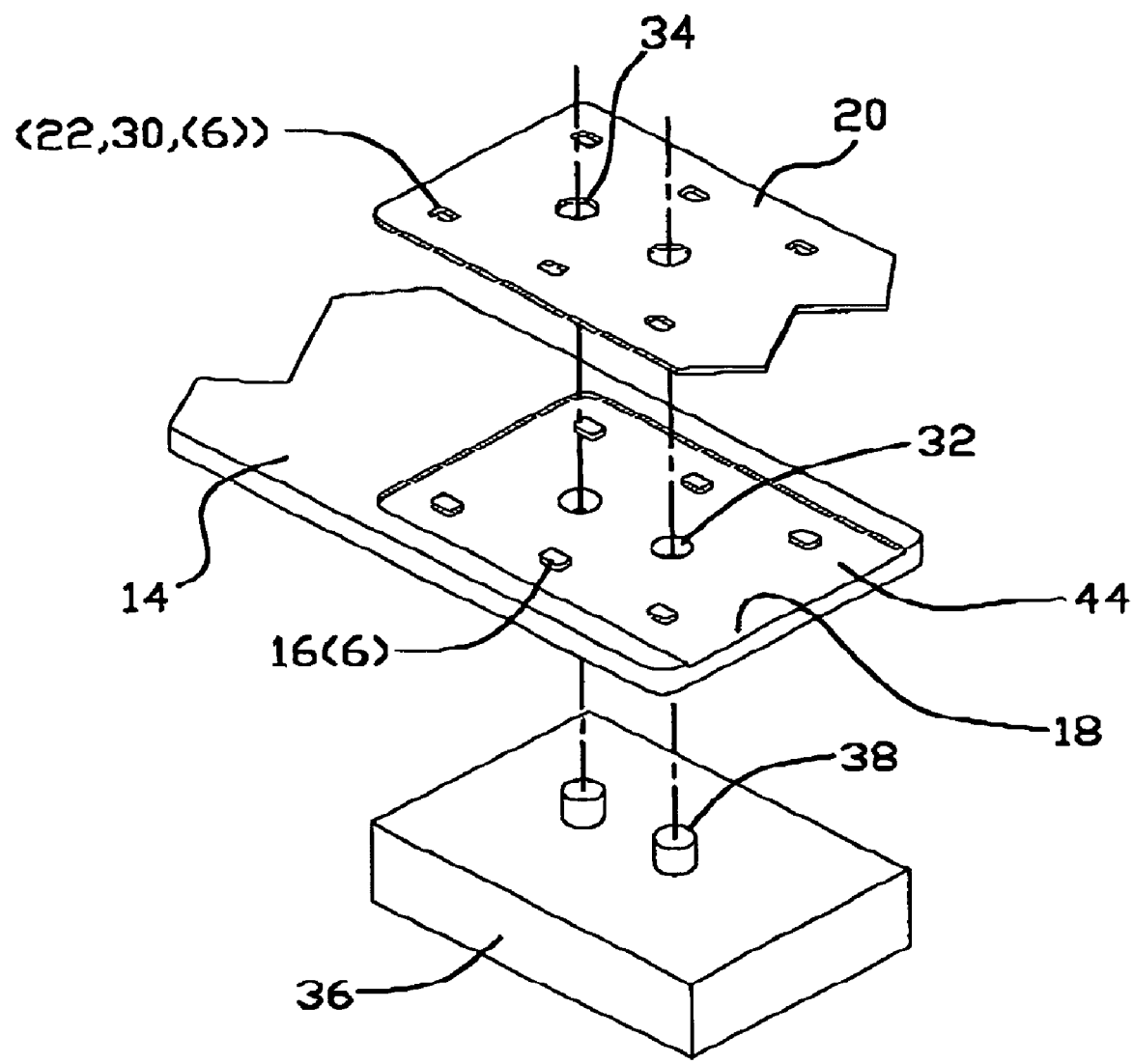
FIG. 2 is a perspective view of, generally, the embodiment shown in FIG. 1, wherein components are not assembled.

FIGS. 1–4 illustrate and the following description refer to physical embodiments of the invention. In addition, the following description refers to methods for making such embodiments, which methods are embodiments of the invention in their own right.

Actuator assembly 10 is useful for supporting a read/write head 12 in an information storage device (not shown). The assembly 10 includes an actuator arm 14 having at least one tower 16 protruding from an arm first surface 18 of the actuator arm 14. A loadbeam 20 has at least one tower receiving means 22 for receiving the at least one tower 16. A tower 16 may be shaped to extend into a tower receiving means 22 when the loadbeam 20 is joined with the actuator arm 14. The tower 16 and tower receiving means 22 are configured such that deforming the tower 16 when within the at least one tower receiving means 22 provides a deformation interference between the tower 16 and the tower receiving means 22 that reduces movement of the tower receiving means 22 relative to the tower 16.

The actuator arm 14 can have a proximal region 24 and a distal region 26. A tower 16 can protrude from the first surface within the distal region 26. The actuator arm 14 can be composed of a first metal, such as aluminum, and the loadbeam 20 can be composed of a second metal, such as steel or more specifically stainless steel. Other metals could be used. In addition, one or both of the actuator arm 14 and loadbeam 20 can be composed of or include a polymeric material, such as polycarbonate, polyester, polyethylene, polypropylene, polyurethane, polyimide, and a variety of other polymeric materials.

A tower 16 may have a shape and composition such that it may be mechanically deformed to provide the deformation interference and allow for performance of the actuator assembly 10 within the information storage device. A tower may be thermally deformed, that is, deformed partly or entirely through the application of heat to the tower. The application of heat can be in conjunction with other actions to deform, such as the application of pressure to deform the tower 16.

The tower 16 can be formed as part of the arm 14, i.e., integral, when fabricating the arm 14, e.g., by machining, stamping, or etching. Or, the tower 16 can be formed as a component separate from and attachable to the arm 14, e.g., welded, brazed, glued, or other known attachment processes.

A tower receiving means 22 may be structurally provided by a first loadbeam surface 28 having at least one tower hole 30 through which the a tower 16 protrudes when the loadbeam 20 is placed on the actuator arm 14. One, two, three, four, or more holes 30 and a corresponding number of towers 16 may be used. A tower hole 30 and a tower 16 may each have a generally circular shape, although other shapes can be used. For example, oval, rectangular, triangular, or other more complex shapes may used instead. Also, it is not necessary that the shape of a tower hole 30 match the shape of a tower 16.

The actuator arm 14 can further include an arm registering means and the loadbeam 20 can further include a loadbeam registering means. The arm registering means can have an arm registering hole 32 therethrough. The loadbeam registering means can have a first loadbeam registering hole 34 therethrough. The arm 14 and loadbeam 20 can be placed onto an assembly fixture 36 that has a registering member 38 such that the first registering member protrudes through the arm registering hole 32 and through the first loadbeam registering hole 34.

The arm registering means can further have additional arm registering holes 32 therethrough, and the loadbeam registering means can have additional loadbeam registering holes 34 therethrough, to work in conjunction with additional registering members 38 in the assembly fixture 36. Placing the arm 14 and loadbeam 20 onto an assembly fixture 36 can cause the additional registering member or members 38 to protrude through the additional arm registering hole or holes 32 and the additional loadbeam registering hole or holes 34.

A method for making an actuator assembly for supporting a read/write device in an information storage device can include providing the actuator arm 14 with one or more towers 16 on an arm first surface 18 of the actuator arm 14. Another step can be to provide a loadbeam 20 having tower receiving means 22 for receiving the on or more towers 16. The loadbeam 20 may be placed onto the actuator arm 14 such that each tower 16 is received by tower receiving means 22. Then, each tower 20 may be deformed to provide a deformation interference between each tower 16 and a tower receiving means 22 to reduce lifting of the loadbeam 20 from the actuator arm 14 where the interference occurs.

The method can further include the step of placing the arm 14 and loadbeam 20 onto an assembly fixture 36 having the one or more registering members 38 such that they protrude through the one or more registering holes 32 of the arm 14 and through one or more registering holes 34 of the loadbeam 20.

Separate from or together with the registering holes and members just noted, the one or more towers 16 and corresponding tower receiving means 22 can provide registration of the arm 14 relative to the loadbeam 20 during assembly of the actuator assembly 10.

The deforming step can include mechanically deforming the tower 16 to provide the deformation interference. For example, the tower 16 can be struck by, for example, known coining members (not shown). The shape of the tower 16 and such coining members can be chosen such that the strike by the coining member causes the tower 16 to deform and interfere with the receiving means 22. For example, the coining member can have a pointed striking surface.

The deforming step can instead rely on the application of heat to melt and deform a portion of a tower 16, which can be accomplished by known applications of a laser beam, ultrasonic energy, contact with a heated member, and other heating means. In addition, the deforming step can include the combination of the above noted applications of pressure and heat.

The assembly methods described above can be augmented with other steps. For example, in conjunction with the deforming step, another step could involve the application of an adhesive or cement to one or more joining points. Such adhesive or cement could, for example, be electrically conductive.

Alternative embodiments in one sense can have or not have an initial interference between the at least one tower and the tower receiving means before the deforming step is carried out. With respect to an initial interference embodiment, the tower 16 and tower receiving means 22, for example, can be configured such that the tower 16 may be press-fit into or through the tower receiving means 22.

Figure 3:
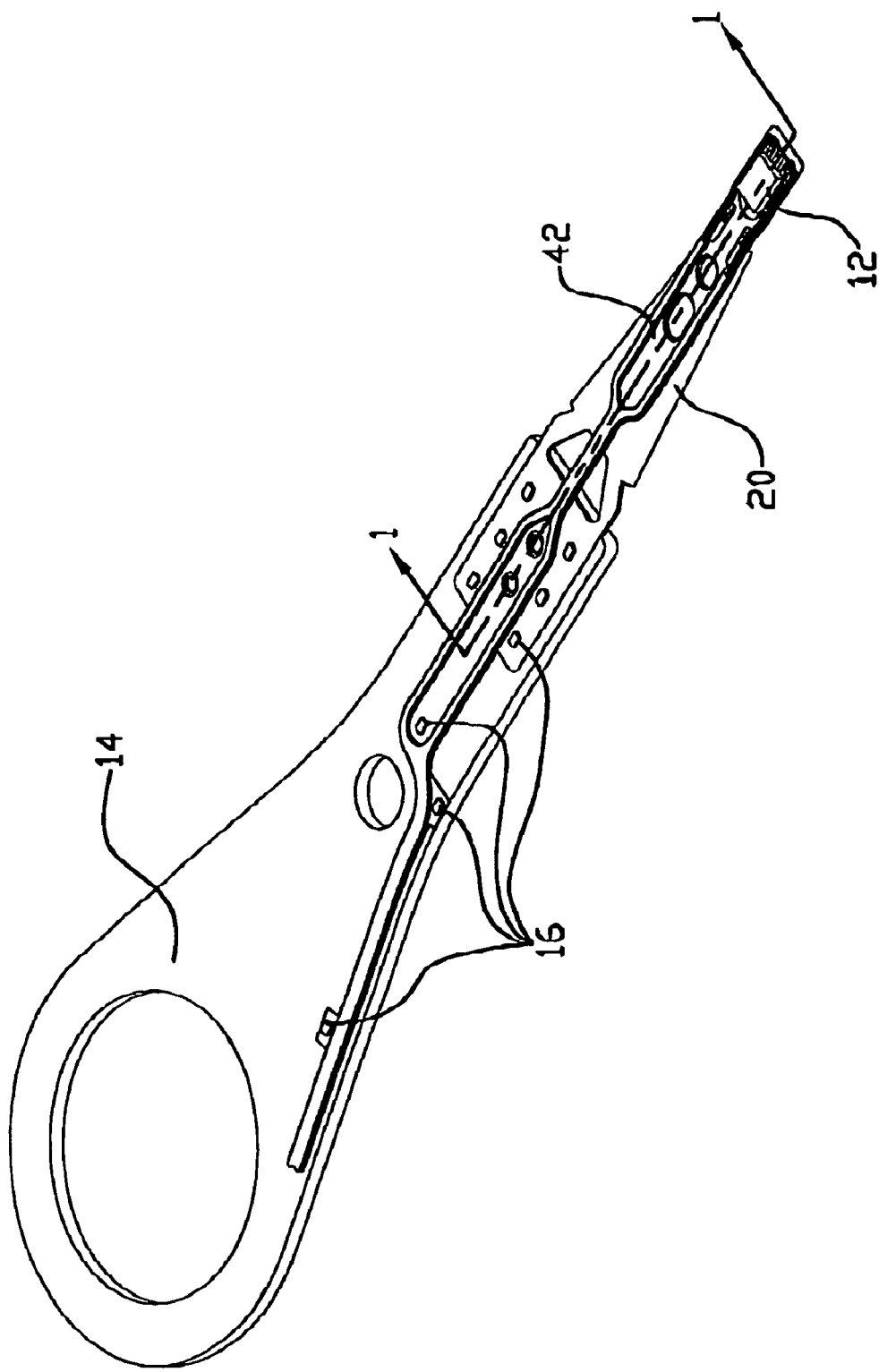
FIG. 3 is a perspective view of the embodiment shown in FIG. 1, wherein components are assembled, but not yet joined.
Figure 4:
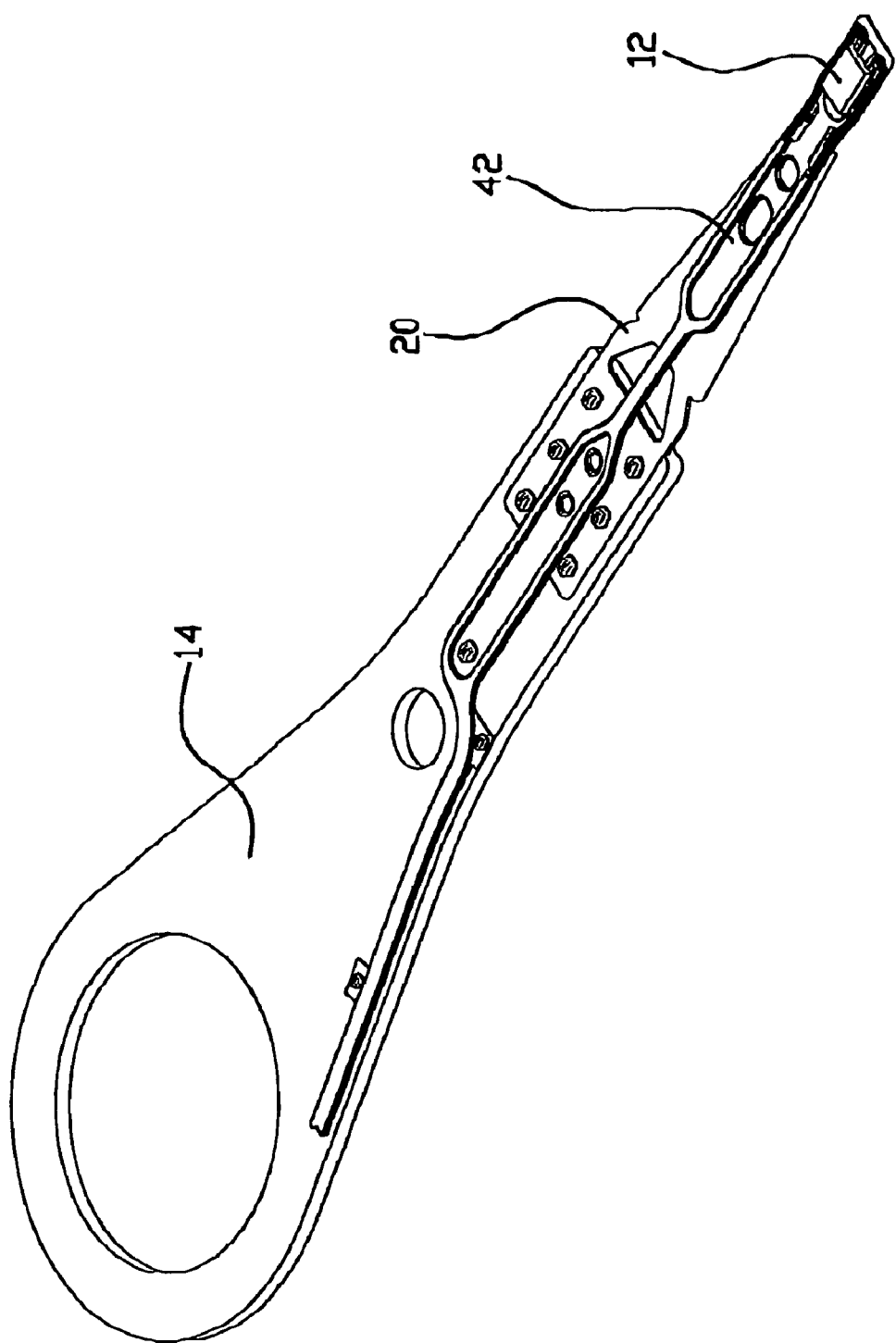
FIG. 4 is a perspective view of the embodiment shown in FIGS. 1 and 2, wherein components are joined.

The disclosure herein discloses embodiments of the invention, but should not be taken as limited to all of the details thereof, as modifications and variations thereof may be made without departing from the spirit or scope of the invention. For example, the disclosure involves joining a loadbeam 20 to an actuator arm 14. And, as shown in FIGS. 3 and 4, the flexure 42 can be similarly joined to the actuator arm 14 using of towers 16 and tower receiving means 22. The flexure 42 could similarly be attachable to the loadbeam 20.

Further, the invention could be applied to suspensions or suspension assemblies having, for example, discrete arms (referred to by some as unamount suspensions). The invention can also apply to other suspensions or suspension assemblies. Still further, the towers 16 on an actuator arm 14 and received by a receiving means 22 on a loadbeam 20 could be rearranged such that one or more of the towers are on the loadbeam 20 and the receiving means 22 on the arm 14.

Further, the disclosure provides a solution for when components to be connected are of dissimilar metals. For example, on one hand, it can advantageous for performance and/or cost purposes to use an aluminum actuator arm and a steel loadbeam or vice versa, and on the other hand, the use of dissimilar metals can eliminate or reduce the effectiveness of an assembly process such as the spot welding or another process for securing the surface of one component to the surface of another component without the need to use an additional connecting material. The disclosed tower 16, tower receiving means 22, and deforming method enable the connecting of components of such dissimilar metals. Though the preceding refers to components of dissimilar metals, it is contemplated that the arm 14, loadbeam 20, and flexure 42 may be constructed of non-metal materials in conjunction with metal materials, e.g., a steel loadbeam 20 partially or entirely coated with a polymeric material.

The disclosed invention may be used in conjunction with known devices, article, compositions of matter, and methods. Further, the invention can be a combination of two or more of the concepts disclosed herein. The invention may be particularly applicable to data storage drive devices, but may also be applicable to other devices. Further, publicly known information regarding the making and using of components and methods described herein augment this disclosure, including information disclosed in patents and published patent applications. For example, U.S. Pat. No. 6,061,896 describes components and methods for making and/or assembling suspensions and/or actuator assemblies that could be used with the invention described or claimed herein; this patent is hereby incorporated by reference.

The invention claimed is:

1. A method for making an actuator assembly for supporting a read/write device in an information storage device, comprising the steps of:
   providing an actuator arm comprising at least one tower on a first arm surface of the actuator arm;
   providing a loadbeam comprising tower receiving means for receiving the at least one tower;
   placing the loadbeam onto the actuator arm such that the at least one tower is received by the tower receiving means;
   deforming the tower to provide a deformation interference between the at least one tower and the tower receiving means and rigidly engage the loadbeam to the actuator arm.

2. The method of claim 1, wherein the actuator arm and the tower are comprised of a first metal and the loadbeam is comprised of a second metal, wherein the first metal is different from the second metal.

3. The method of claim 2, wherein the first metal is aluminum and the second metal is steel.

4. The method of claim 2, wherein the loadbeam has a first loadbeam surface, and wherein the difference between the first and second metals prevent attaching the loadbeam to the actuator arm by spot welding, ultrasonically welding, or other welding of the first loadbeam surface to the first arm surface.

5. The method of claim 1, wherein, before the deforming step, there is not an initial interference fit between the tower and the tower receiving means.

6. The method of claim 1, wherein the tower receiving means comprises a first loadbeam surface having a hole through which the at least one tower protrudes after the placing step.

7. The method of claim 6, wherein the at least one tower comprises a plurality of towers and the first loadbeam surface has a plurality of holes through which the plurality of towers protrude after the placing step.

8. The method of claim 7, wherein the plurality of holes have a substantially circular shape and the plurality of towers have a substantially circular shape.

9. The method of claim 7, wherein the plurality of holes have a substantially elongated shape and the plurality of towers have a substantially elongated shape.

10. The method of claim 1, wherein the actuator arm further comprises an arm registering means and the loadbeam further comprises a loadbeam registering means.

11. The method of claim 10, wherein the arm registering means having an first arm registering hole therethrough and wherein the loadbeam registering means having a first loadbeam registering hole therethrough, wherein the method further comprises the step of placing the arm and loadbeam onto an assembly fixture having a first registering member such that the first registering member protrudes through the first arm registering hole and through the first loadbeam registering hole.

12. The method of claim 11 wherein the arm registering means further has a second arm registering hole therethrough, wherein the loadbeam registering means has a second loadbeam registering hole therethrough, wherein the assembly fixture further has a second registering member, wherein the step of placing the arm and loadbeam onto an assembly fixture causes the second registering member to protrude through the second arm registering hole and the second loadbeam registering hole.

13. The method of claim 1, wherein the at least one tower and the tower receiving means combine to provide registration of the arm relative to the loadbeam during assembly of the actuator assembly.

14. The method of claim 1, wherein the deforming step comprises the step of mechanically deforming the tower to provide the deformation interference.

15. The method of claim 1, wherein the at least one tower is comprised of a metal and the deforming step comprises melting the metal to provide the deformation interference, wherein the melting is accomplished by an application of one of a laser beam, ultrasonic energy, contact with a heated member, and another heating means.

16. The method of claim 1, wherein initial interference between the at least one tower and the tower receiving means exists before the deforming step.

* * * * *

UNITED STATES PATENT AND TRADEMARK OFFICE
CERTIFICATE OF CORRECTION

PATENT NO. : 7,207,097 B2  Page 1 of 1
APPLICATION NO. : 10/767944
DATED : April 24, 2007
INVENTOR(S) : Michael E. Detjens et al.

It is certified that error appears in the above-identified patent and that said Letters Patent is hereby corrected as shown below:

Column 8, line 57 [claim 15], delete "another" and insert therefore --other--

Signed and Sealed this

Twelfth Day of June, 2007

JON W. DUDAS
*Director of the United States Patent and Trademark Office*